US009090147B2

(12) United States Patent
Nellen et al.

(10) Patent No.: US 9,090,147 B2
(45) Date of Patent: Jul. 28, 2015

(54) SUNSHADE ASSEMBLY AND OPEN ROOF CONSTRUCTION PROVIDED THEREWITH (75) Inventors: Marcel Johan Christiaan Nellen, Merselo (NL); Stephan Christiaan Vervoort, Boxmeer (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/150,796

(22) Filed: Jun. 1, 2011

(65) Prior Publication Data

US 2011/0227371 A1 Sep. 22, 2011

Related U.S. Application Data

(63) Continuation-in-part of application No. PCT/EP2008/066650, filed on Dec. 2, 2008.

(51) Int. Cl.
*B60J 7/043* (2006.01)
*B60J 7/00* (2006.01)

(52) U.S. Cl.
CPC ............ *B60J 7/0015* (2013.01); *Y10T 16/3797* (2015.01)

(58) Field of Classification Search
CPC .......................... B60J 7/0015; Y10T 16/3797
USPC ...................... 296/97.8, 97.4, 97.9; 160/273.1
See application file for complete search history.

(56) References Cited

U.S. PATENT DOCUMENTS

| 1,370,500 A | 3/1921 | Jones ............................ 160/23.1 |
| 1,459,155 A | 6/1923 | Ioor ................................ 160/25 |
| 1,673,326 A | 6/1928 | Goldsmith .................. 160/267.1 |
| 3,017,927 A | 1/1962 | Demko .......................... 160/271 |
| 4,649,981 A * | 3/1987 | Bibeau .......................... 160/120 |
| 5,117,892 A | 6/1992 | Murray ....................... 160/273.1 |
| 5,934,353 A | 8/1999 | Buhr ............................. 160/269 |

(Continued)

FOREIGN PATENT DOCUMENTS

| CN | 2700152 Y | 5/2005 |
| CN | 1721216 A | 1/2006 |

(Continued)

OTHER PUBLICATIONS

European Search Report of the European Patent Office in counterpart foreign application No. 09180676.0 filed Dec. 23, 2009.

(Continued)

*Primary Examiner* — Glenn Dayoan
*Assistant Examiner* — Melissa A Black
(74) *Attorney, Agent, or Firm* — Steven M. Koehler; Westman, Champlin & Koehler, P.A.

(57) ABSTRACT

A sunshade assembly includes a sunscreen of which the longitudinal edges are provided with guide strips which are substantially rigid in transverse direction. Opposed elongated longitudinal guide rails each include a guide channel section defining a guide channel in which the respective guide strip is accommodated when the sunscreen is moved between open and closed positions. The guide channel of each guide rail being bounded on the side facing the opposed guide rail by a guide flange (14) supporting the guide strip in a direction towards the opposed guide rail. A part of the guide channel section of at least one guide rail is resilient such that at least the portion of the guide flange supporting the guide strip is resiliently yieldable in a direction towards the opposed guide rail under the influence of forces exerted by the sunscreen.

22 Claims, 6 Drawing Sheets

(56) References Cited

U.S. PATENT DOCUMENTS

| | | | |
|---|---|---|---|
| 6,179,373 B1 | 1/2001 | Bohm et al. | 296/214 |
| 6,394,173 B2 | 5/2002 | Enssle | |
| 6,942,003 B2 | 9/2005 | Thompson | 160/268.1 |
| 7,114,766 B2 | 10/2006 | Becher et al. | |
| 7,114,767 B2 | 10/2006 | Grimm et al. | |
| 7,793,702 B2 | 9/2010 | Biewer et al. | 160/370.22 |
| 7,971,626 B2 | 7/2011 | Renz | 160/370.22 |
| 2005/0225122 A1 | 10/2005 | Grimm | |
| 2005/0225123 A1 | 10/2005 | Grimm | |
| 2006/0027347 A1 | 2/2006 | Boehm | |
| 2007/0175603 A1 | 8/2007 | Lin | |
| 2008/0179021 A1 | 7/2008 | Biewer et al. | |
| 2009/0145559 A1* | 6/2009 | Glasl et al. | 160/273.1 |
| 2009/0178771 A1 | 7/2009 | Lin | 160/370.22 |
| 2011/0146921 A1 | 6/2011 | Nellen et al. | 160/315 |
| 2011/0227371 A1 | 9/2011 | Nellen et al. | |

FOREIGN PATENT DOCUMENTS

| | | |
|---|---|---|
| DE | 102004028882 | 1/2006 |
| DE | 202006015107 | 1/2007 |
| EP | 1588880 | 10/2005 |
| EP | 1616737 | 1/2006 |
| EP | 1953018 | 8/2008 |
| FR | 1378077 | 11/1964 |
| WO | WO 2006053520 | 5/2006 |
| WO | WO 2010022769 | 3/2010 |

OTHER PUBLICATIONS

State Intellectual Property Office of the People's Republic of China for corresponding application No. 200880132126.7 filed Dec. 2, 2008, Search Report.

Official Search Report of the European Patent Office in counterpart foreign application No. PCT/EP2008/066650 filed Dec. 2, 2008.

Written Opinion of the European Patent Office in counterpart foreign application No. PCT/EP2008/066650 filed Dec. 2, 2008.

* cited by examiner

SUNSHADE ASSEMBLY AND OPEN ROOF CONSTRUCTION PROVIDED THEREWITH

CROSS-REFERENCE TO RELATED APPLICATIONS

This application is a continuation-in-part under 35 U.S.C. Section 120 of International Application PCT/EP2008/066650 filed Dec. 2, 2008 and published as WO 2010/063312 in English, the content of which is incorporated herein by reference in its entirety.

BACKGROUND

The discussion below is merely provided for general background information and is not intended to be used as an aid in determining the scope of the claimed subject matter.

Aspects of the invention relate to a sunshade assembly.

A major field of application of sunshade assemblies is defined by open roof constructions for vehicles comprising a roof opening in a stationary roof part and a movable closure panel for opening and closing said roof opening, wherein below said roof opening there is provided such a sunshade assembly.

A known sunshade assembly comprises a guide rail comprising a fastening section, a guide channel section and a connecting section between these two. The connecting section is flexible so as to allow the guide channel section to yield when the sunscreen exerts a pulling force on the guide strips.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A sunshade assembly includes a sunscreen having upper and lower sides, opposed longitudinal edges and opposed transversal edges, the longitudinal edges being provided with guide strips which are substantially rigid in a transverse direction. The opposed elongated longitudinal guide rails each include a guide channel section defining a guide channel in which the respective guide strip is accommodated when the sunscreen is moved between open and closed positions. The guide channel of each guide rail is bounded on the side facing the opposed guide rail by a guide flange supporting the guide strip in a direction towards the opposed guide rail. A part of the guide channel section of at least one guide rail is resilient such that at least the portion of the guide flange supporting the guide strip is resiliently yieldable in a direction towards the opposed guide rail under the influence of forces exerted by the sunscreen. In this assembly, only a part of the guide channel section yields which provides a good control of the yielding movements.

In one embodiment, the guide flange itself is at least partially flexible in a direction towards the opposed guide rail, so that the elastic deformation is close to where the forces are exerted.

The guide flange may be made separate of a remaining portion of the guide rail, and can be made from another material, for example plastic or spring steel. As a result, the guide flange may be designed specifically for its resiliency or guiding function.

A simple embodiment can be obtained if the guide flange is removably connected, in particular clipped to the remaining portion of the guide rail, for example to an adjacent, substantially horizontal portion of the guide rail.

An aspect of the invention further relates to a guide rail assembly as described above, and to an open roof construction for a vehicle, comprising a roof opening in a stationary roof part and a movable closure panel for opening and closing said roof opening, wherein below said roof opening there is provided at least one sunshade assembly as described herein.

BRIEF DESCRIPTION OF THE DRAWINGS

Hereinafter the invention will be further elucidated with reference to the drawing schematically showing embodiments of the invention by way of example.

DETAILED DESCRIPTION OF THE ILLUSTRATIVE EMBODIMENTS

Figure 1:
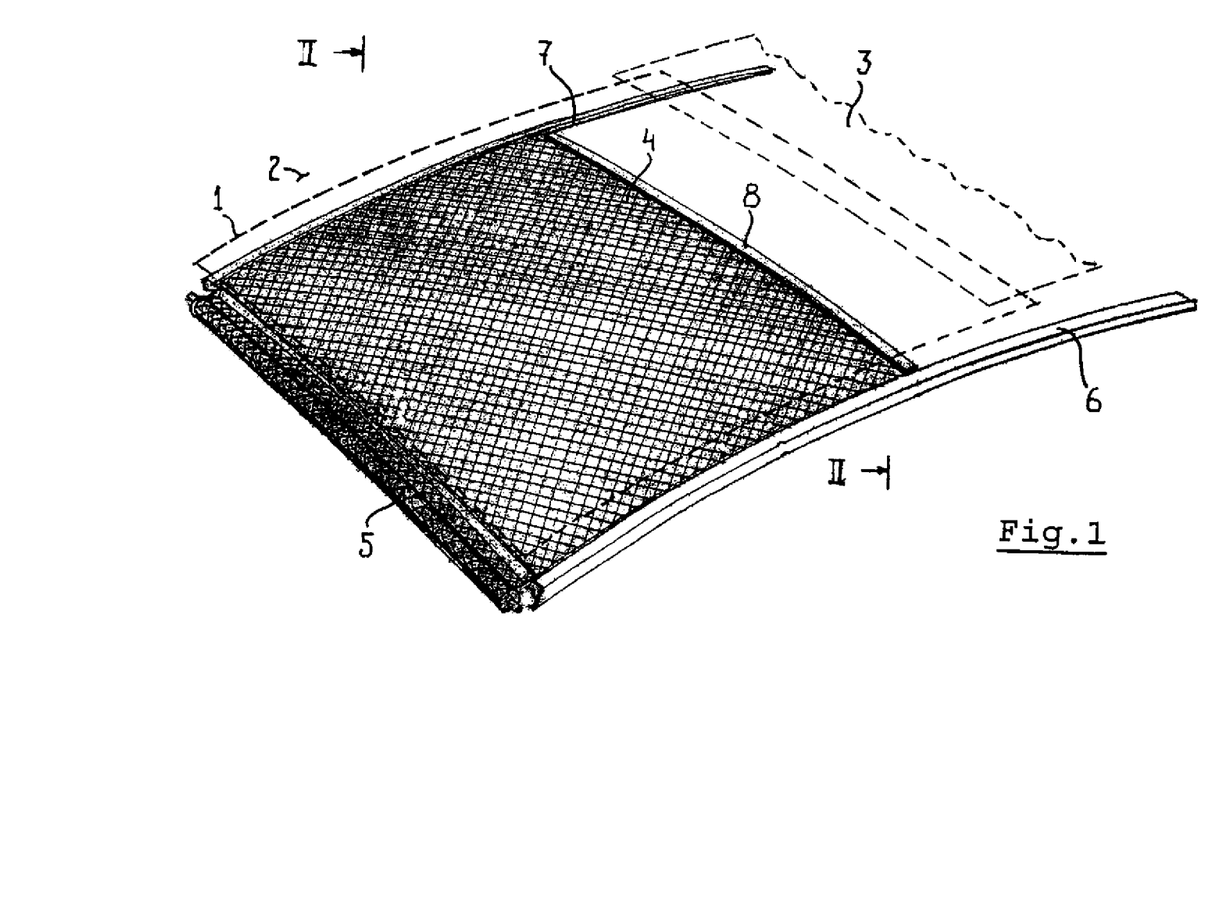
FIG. 1 shows, schematically and in a perspective view, a sunshade assembly applied to an open roof construction.

Firstly referring to FIG. 1, an open roof construction for a vehicle is illustrated schematically in dotted lines. Said open roof construction comprises a roof opening 1 in a stationary roof part 2 of the vehicle, such as a passenger car, and a movable closure panel 3 which, by means not illustrated in detail but known per se, can be moved for opening and closing said roof opening 1. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4, and two opposite guide rails 6 and 7 for cooperation with two opposite longitudinal edges of the sunscreen 4.

In so far the sunshade assembly has a conventional shape. Further, in a way known per se, the end of the sunscreen 4 opposite the end which is wound onto the winding shaft 5 is provided with an operating beam 8 which may be gripped manually or driven by an electric motor or the like for operating the sunscreen 4 and locating it in a desired position. The opposite ends of the operating beam 8 are guided in guides not illustrated here (extending along with or integrated into the guide rails 6, 7).

Figure 2:
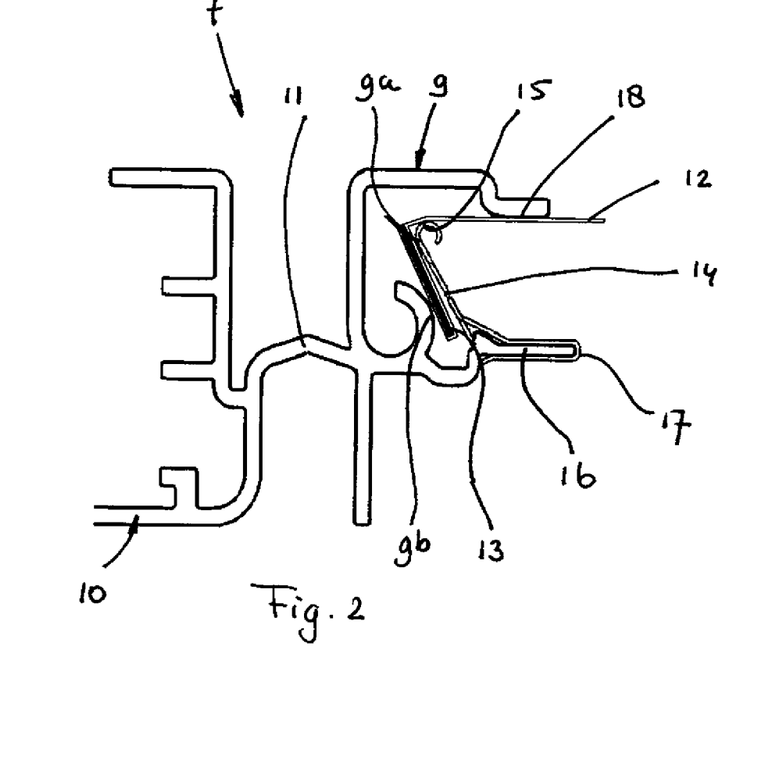
FIG. 2 shows a transverse cross section according to the lines II-II in FIG. 1.

Now Reference is Made to FIG. 2.

FIG. 2 shows a cross section of one transverse edge of the sunscreen 4 and of the guide rail 7. The guide rail 7 comprises a guide channel section 9 for cooperation with the sunscreen 4, a main section 10 which may include the operation mechanism for the closure panel and a connecting section 11 interconnecting the main section 10 and the guide channel section 9.

There is shown a side portion 12 of the sunscreen 4 which in this case is substantially inelastic at least in transverse direction (transverse to the guide rail 7). It may for example be made from a relatively thick fabric. Of course, it is possible to make a portion or the whole sunscreen from stretchable material, such as stretch textile, but this is not necessary according to the invention. The fabric may be treated so as to obtain a low frictional resistance when sliding along the guide rail 6 or 7.

Attached to the lateral outer end of each side portion 12 of the sunscreen 4 is a guide strip 13, which is thus provided on each longitudinal edge of the sunscreen 4. This guide strip 13, which is straight in cross section in this embodiment, is accommodated in the guide channel defined by the guide channel section 9 of the guide rails 6, 7. The guide channel section 9 is shaped such that the guide strip 13 is guided in the guide channel with such orientation that it makes an acute angle with the main portion of the sunscreen 4 in the transverse direction.

In this embodiment, in which the sunscreen portion 12 is attached to an extreme edge, in this case the upper edge, of the guide strip 13 (or at least the forces from the sunscreen are exerted on the upper edge), the guide strip 13 is only in contact with the guide channel section 9 in its upper portion on the side facing the sunscreen 4 (guide channel portion 9a) and in its lower portion on its side facing away from the sunscreen 4 (rounded guide channel portion 9b). In height direction, that is in a direction perpendicular to the longitudinal axis of the guide strip 13 and within the plane of the guide strip 13, there is freedom of movement for the strip 13 and normally the strip 13 remains clear with its longitudinal edges from the upper and lower walls of the guide channel section 9.

The guide channel section 9 is bounded on the side facing the sunscreen 4 and facing the opposed guide rail (not shown) by a guide flange 14 having on its free end a guide edge 15. This guide edge 15, in the position shown in FIG. 2, is in contact with the lower side of the portion 12 of the sunscreen 4. The position of the guide strip 13 according to FIG. 2 is an equilibrium position to which the guide strip 13 will return after it has been displaced by external influences, for example if somebody pushes against the sunscreen from below. A second guide edge 18 substantially opposite to the guide edge 15, but preferably offset towards the opposed guide rail, may guide the sunscreen on the other, in this case upper, side so as to prevent large vertical forces on the guide strip 13. The guide strip 13 is able to pivot against the resiliency of the guide flange 14, thereby using the stationary guide channel portion 9b substantially as a (movable) pivot point for the guide strip 13, so that the acute angle of the guide strip 13 with respect to the main portion of the sunscreen 4 varies and thereby adapts to the stretching forces in the sunscreen 4. So, the guide strip 13 is supported on opposite sides by two spaced apart parts wherein one part is stationary and the other is resiliently movable, in this case the one facing away from the other guide rail 6.

The behaviour of the guide strip 13 in the guide channel section will be comparable to that as disclosed in the international application PCT/EP2008/061201, the contents of which are incorporated herein by reference thereto.

As is clearly shown in FIG. 2, the guide flange 14 can be made from a separate part, in this case a part made of a different resilient material which is clipped to a horizontal flange 16 of the remaining portion of the guide channel section 9 by means of a clip portion 17 or another fixed or removable connection. The guide flange 14 is designed such that it will slightly yield under the pretension force in the sunscreen 4 so a to keep it taut, and it may yield further under temporary higher tension forces exerted by the sunscreen on the guide flange 14, for example as a result of (temperature) shrinkage. The yielding properties will also compensate production tolerances in sunscreen 4 and guide rails 6, 7 so that the sunscreen 4 will be kept taut in every situation, and the frictional resistance of the guide strips 13 in the guide channel section 9 will be kept within tight limits.

The guide flange 14 can be made of spring steel or another resilient material such as plastic. The remaining part of the guide channel section 9 and preferably the guide rail 6, 7 is made from a suitable low friction material such as aluminium or plastic. The guide edge and/or guide channel may be treated to further reduce frictional resistance. In one embodiment, both guide rails have a structure as is represented in FIG. 2, but in principle it would be possible to make the opposed guide channel section with a stiff guide flange instead of such resilient guide flange 14.

Figure 3:
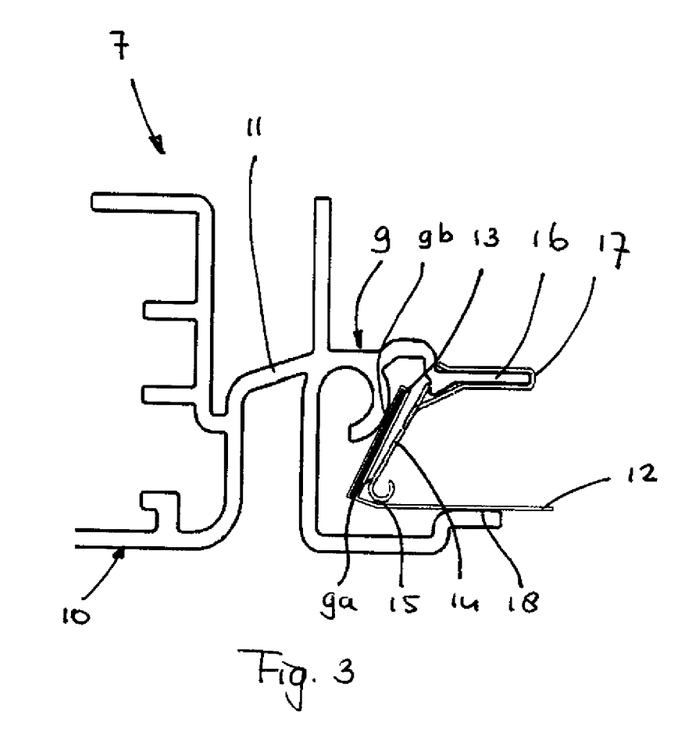
FIGS. 3 and 4 are views corresponding to that of FIG. 2 and showing alternative embodiments of the guide channel.

FIG. 3 shows an alternative "upside down" embodiment which will work in a similar way as the first embodiment.

Figure 4:
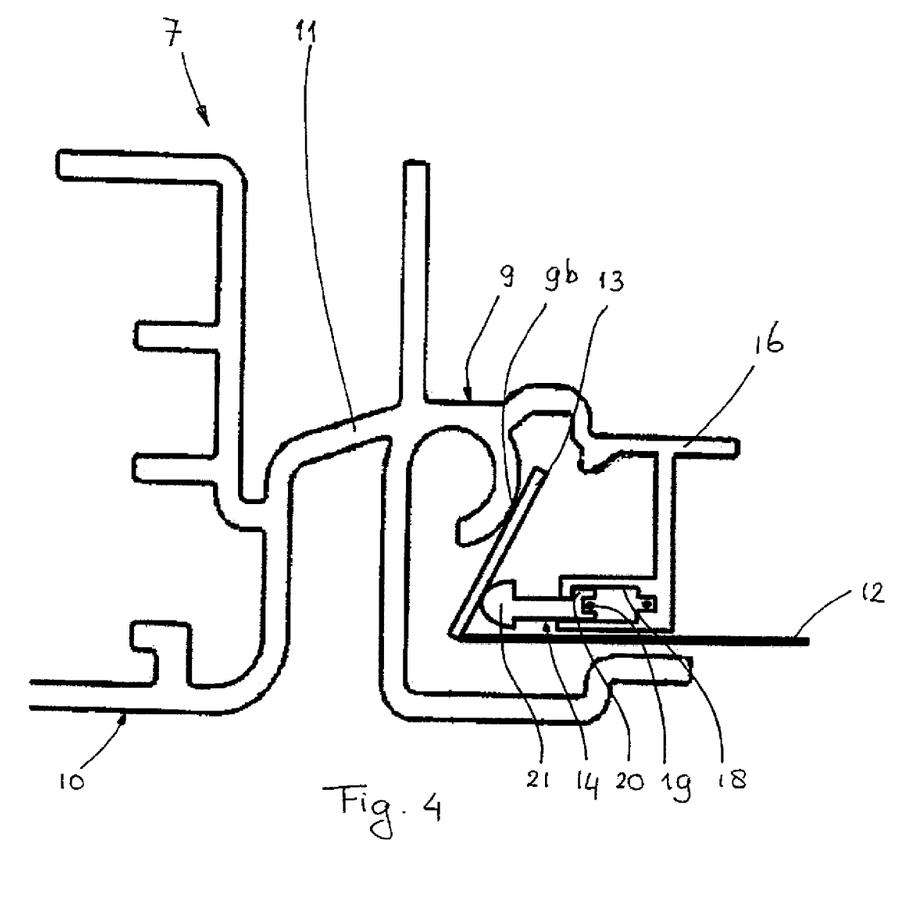

FIG. 4 shows a further embodiment in which that the guide flange 14 is slidably connected and resiliently attached to the remaining portion of the guide channel section 9, so that it may slide towards and away from the opposed guide rail 6 under a spring force. More particularly, the guide flange 14 is a strip guided substantially parallel to the surface of the sunscreen 12, and is guided with a guide end in a linear guide portion 18 of the guide channel section 9 spaced from the lower side thereof. A separate spring 19 (or several springs distributed over the length of the guide flange 14) is accommodated within the guide portion 18 and biases the guide flange 14 so as to stretch the sunscreen 12. In this embodiment the guide flange 14 is provided with a stop 20 determining the maximum distance or spring path of the guide flange 14 away from guide portion 18 but this stop may be dispensed with. The end of the guide flange 14 facing the guide strip 13 of the sunscreen 12 has a rounded head 21 to enable smooth engagement of the guide strip 13 under different angles. The guide flange 14 may be made of steel, plastic or other suitable material. The lower side of the linear guide portion 18 may guide the portion 12 of the sunscreen 4.

Figure 5:
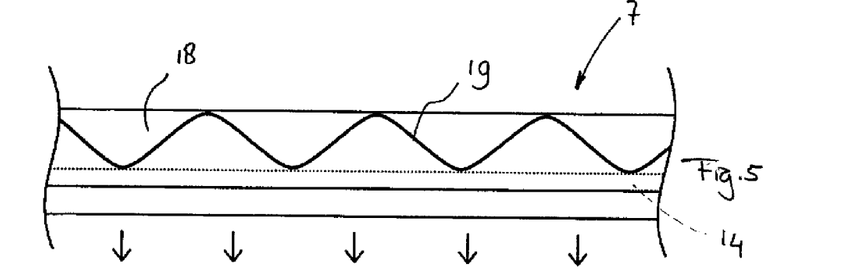
FIGS. 5 and 6 are sectional views along the line V-V in FIG. 4, in two different positions of the spring.
Figure 6:
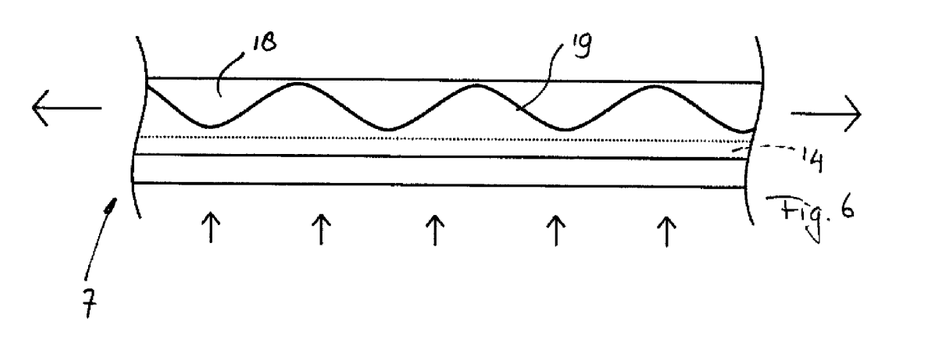

An embodiment of the spring 19 is shown in FIGS. 5 and 6. The spring 19 is sinus or zigzag-shaped such that the zigzag or sinus extends in the plane in which spring force is needed. In the embodiment shown, the spring 19 can be extended somewhat when the sunscreen 4 and therewith the guide strip 13 is moved so that the lateral width of the spring 19 and thereby the lateral force on the guide strip 13 is reduced and lower force is needed to move the sunscreen 4. When the sunscreen 4 is stationary again the spring 19 returns to its original shape and the spring force is maximized so that the sunscreen 4 is tensioned in an adequate manner.

Figure 7:
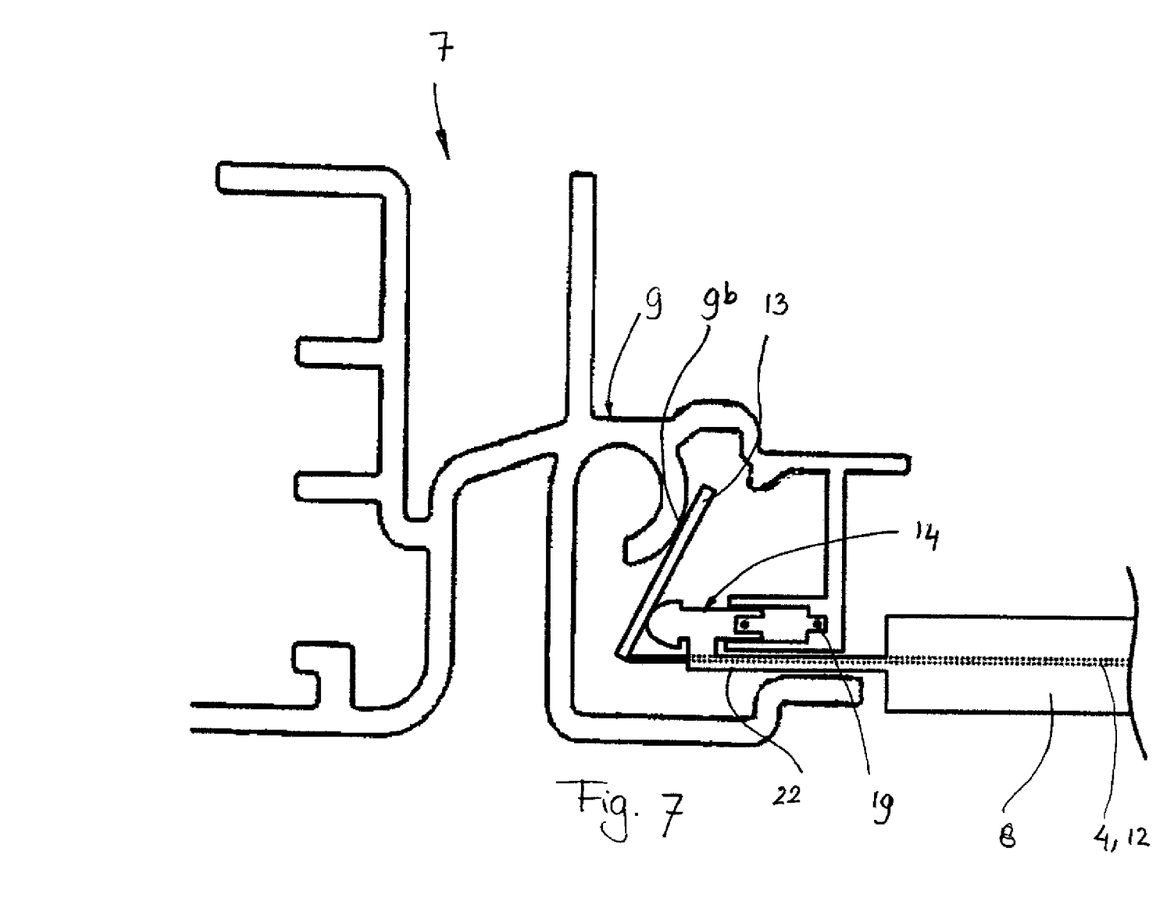
FIG. 7 is a view corresponding to that of FIG. 2 and showing a further alternative embodiment of the guide channel.

FIG. 7 shows a variation of the embodiment of FIG. 4, in which the guide flange 14 is connected to the operating beam 8 by means of a connecting member 22, such that the guide flange 14 moves together with the sunscreen 4 and guide strip 13. The guide flange 14 may be rolled up together with the sunscreen, but then of course the shape of the guide flange 14 should be such that it can be rolled up. In the embodiment shown, the guide flange 14 could be moved into a guide rail extending past the winding shaft 5 (not shown). The spring 19 will move together with the guide flange 14 and the spring 19 and guide flange 14 will be guided in an effective way with respect to the guide rail 6, 7. The spring 19 may be connected to the operating beam 8 as well, if desired, such that the spring 19 is extended before the guide flange 14 is moved.

From the foregoing it is clear that the invention provides a sunshade assembly which has a simple yet effective guide means for the sunscreen, which excels in low and constant friction properties.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims. For example, the guide flange may comprise a resiliently yieldable hinge instead of being resiliently itself. It is also possible that a portion of the guide channel section adjacent to the guide flange is resilient. It is further conceivable that only a part of the guide flange is resilient or resiliently movable. The guide strip may also be guided by two flanges, of which one or each is resiliently flexible. The guide strip of the sunscreen may have other cross sectional shapes, such as a circular segment or other non-straight shapes. It would also be possible that the guide flange is stationary, while the guide channel portion on the other side of the guide strip is resilient, or both could be resilient.

What is claimed is:

1. A sunshade assembly comprising:
   a sunscreen made of a flexible material, having upper and lower sides, opposed longitudinal edges and opposed transversal edges;
   a separate guide strip attached to the sunscreen proximate each of the longitudinal edges, each guide strip being substantially rigid in a transverse direction to the longitudinal edges; and
   opposed elongated longitudinal guide rails each including a guide channel section defining a guide channel in which the respective guide strip is accommodated when the sunscreen is moved between open and closed positions, the guide channel of each guide rail being bounded on a side facing the opposed guide rail by a guide flange supporting the guide strip in a direction towards the opposed guide rail, wherein a part of the guide channel section of at least one guide rail is resilient such that at least a portion of the guide flange supporting the guide strip is resiliently yieldable in a direction towards the opposed guide rail under the influence of forces exerted by the sunscreen, and wherein the guide channel section further comprises a stationary guide channel portion having a convex surface and wherein the guide strip is supported in the guide channel on a first side by the guide flange and an opposite side by the convex surface of the stationary guide channel portion.

2. The sunshade assembly according to claim 1, wherein the guide flange itself is at least partially flexible in a direction towards the opposed guide rail.

3. The sunshade assembly according to claim 1, wherein the guide flange is joined to a remaining portion of the guide rail as a separate part.

4. The sunshade assembly according to claim 3, wherein the guide flange is made from another material than the remaining portion of the guide rail.

5. The sunshade assembly according to claim 4, wherein the guide flange is removably connected to the remaining portion of the guide rail.

6. The sunshade assembly according to claim 5, wherein the guide flange is connected to an adjacent, substantially horizontal portion of the guide rail.

7. The sunshade assembly according to claim 1, wherein the guide flange is oriented at an acute angle transversely to accommodate the guide strip at an acute angle with respect to a main portion of the sunscreen.

8. The sunshade assembly according to claim 1, wherein the guide strips are bendable along their length, and the sunshade assembly further comprises a rotatable winding shaft configured to wind and unwind the sunscreen and the guide strips at a first one of the transversal edges.

9. The sunshade assembly according to claim 1, wherein the guide flange comprises a free end with a guide edge which is in engagement with and guides a side of the flexible sunscreen facing the guide strip.

10. The sunshade assembly according to claim 9, wherein the sunscreen is attached to one edge of the strip, the guide channel being shaped such that the guide strip is in contact with the guide channel only with a portion of the guide strip remote from the sunscreen on a side of the guide strip facing away from the sunscreen and with a portion of the guide strip adjacent the sunscreen on side of the guide strip facing the sunscreen.

11. The sunshade assembly according to claim 1, wherein the guide strip is substantially straight in cross section.

12. The sunshade assembly according to claim 3, and further comprising at least one spring member, wherein the guide flange is slidable in a guide portion of the guide channel section, and is biased by said at least one spring member.

13. A sunshade assembly comprising:
   a sunscreen made of a flexible material having upper and lower sides, opposed longitudinal edges and opposed transversal edges;
   a separate guide strip which is substantially rigid in a transverse direction to the longitudinal edges, wherein each separate guide strip is attached to one of the longitudinal edges to allow free pivoting movement with respect to the sunscreen; and
   opposed elongated longitudinal guide rails each including a guide channel section defining a guide channel in which the respective guide strip is accommodated when the sunscreen is moved between open and closed positions, the guide channel of each guide rail being bounded on a side facing the opposed guide rail by a guide flange supporting the guide strip in a direction towards the opposed guide rail, wherein the guide flange supporting the guide strip is joined to a remaining portion of the guide rail as a separate part and is biased by a spring force in a direction towards the opposed guide rail under the influence of forces exerted by the sunscreen, and wherein the guide strip is supported within the guide channel section against an arcuate surface of a stationary guide channel portion so as to substantially pivot with respect to the guide channel section against the spring force wherein contact of the guide strip with the stationary guide forms a pivot that moves on the arcuate surface based upon the force exerted on the sunscreen, and wherein the guide strip is supported in the guide channel on a first side by the guide flange and an opposite side by the stationary guide channel portion to limit pivoting movement of the guide strip.

14. The sunshade assembly according to claim 13, and further comprising at least one spring member wherein the guide flange is slidable in a guide portion of the guide channel section, and is biased by said at least one spring member.

15. An open roof construction for a vehicle, comprising a roof opening in a stationary roof part and a movable closure panel configured to open and close said roof opening, wherein below said roof opening there is provided at least one sunshade assembly according to claim 1.

16. A guide rail assembly for a flexible sunscreen having guide strips on opposed longitudinal edges, comprising:

opposed elongated longitudinal guide rails each including a guide channel section defining a guide channel in which a respective guide strip of the sunscreen can be accommodated, the guide channel of each guide rail being bounded on a side facing the opposed guide rail by a guide flange supporting the guide strip in a direction towards the opposed guide rail and is bounded on the other side by a guide channel portion having a convex surface that is spaced from the guide flange, wherein at least one of the guide flange and guide channel portion is resilient and having a spring force and configured such that the guide strip is able to pivot against the spring force when the sunscreen pulls in a direction towards the opposed guide rail, the guide flange comprising a free end with a rounded guide edge to engage and guide a side of the flexible sunscreen.

17. The guide rail assembly according to claim 16, wherein the guide flange is resilient, and the guide rail assembly further comprises a separate spring member configured to provide the resiliency.

18. The guide rail assembly according to claim 17, wherein the guide flange is movable in a longitudinal direction of the guide rail, and is coupled to the sunscreen.

19. The guide rail assembly according to claim 17, wherein the spring member is configured to exert a larger spring force on the guide strip and sunscreen when the sunscreen is stationary than when the sunscreen is moving in the longitudinal direction of the guide rail.

20. The guide rail assembly according to claim 16, wherein the convex surfaces are configured to face each other when a sunscreen extends between the opposed guide rails.

21. The sunshade assembly according to claim 1, wherein the convex surfaces are configured to face each other with the sunscreen extending between the opposed guide rails.

22. The sunshade assembly according to claim 13, wherein the arcuate surfaces are configured to face each other with the sunscreen extending between the opposed guide rails.

* * * * *